US012656461B2

(12) United States Patent
Fincato

(10) Patent No.: US 12,656,461 B2
(45) Date of Patent: Jun. 16, 2026

(54) MICROPRISM AND MICROLENS ARRAY FOR USE IN LIDAR SYSTEM

(71) Applicant: STMicroelectronics S.r.l., Agrate Brianza (IT)

(72) Inventor: Antonio Fincato, Cameri (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 986 days.

(21) Appl. No.: 17/882,173

(22) Filed: Aug. 5, 2022

(65) Prior Publication Data

US 2024/0045030 A1    Feb. 8, 2024

(51) Int. Cl.
| | |
|---|---|
| *G01S 7/481* | (2006.01) |
| *G01S 7/497* | (2006.01) |
| *G02B 6/12* | (2006.01) |
| *G02B 6/42* | (2006.01) |
| G02B 6/136 | (2006.01) |

(52) U.S. Cl.
CPC ............ *G01S 7/4814* (2013.01); *G01S 7/497* (2013.01); *G02B 6/12004* (2013.01); *G02B 6/4214* (2013.01); *G02B 6/136* (2013.01)

(58) Field of Classification Search
CPC ...... G01S 7/4814; G01S 7/497; G01S 7/4813; G01S 7/481; G01S 7/4816; G02B 6/4214; G02B 6/12004; G02B 6/136
USPC ....................................... 356/4.01
See application file for complete search history.

(56) References Cited

U.S. PATENT DOCUMENTS

| | | | | | |
|---|---|---|---|---|---|
| 5,835,458 | A | * | 11/1998 | Bischel | ................ G11B 7/1353 |
| | | | | | 369/44.29 |
| 7,590,326 | B2 | | 9/2009 | Fincato et al. | |
| 10,198,972 | B2 | * | 2/2019 | Basset | .................. B65D 55/026 |

OTHER PUBLICATIONS

Ito, Hiroyuki, et al: "Wide Beam Steering by Slow-Light Waveguide Gratings and a Prism Lens," Optica, vol. 7, No. 1, Jan. 2000, 6 pgs.

* cited by examiner

*Primary Examiner* — Daniel L Murphy
(74) *Attorney, Agent, or Firm* — Crowe & Dunlevy LLC

(57)     ABSTRACT

A LIDAR optical unit includes a photonic-integrated-circuit (PIC) affixed to a carrier. The PIC includes an input coupler and an array of output couplers, with a switchable optical network connecting the input coupler to different selected ones of the array of output couplers. A laser source is mounted to the PIC adjacent the input coupler such that laser light generated by the laser source is injected into the input coupler. An optical stack is mounted to the PIC adjacent the array of output couplers to receive laser light extracted from the switchable optical network by the array of output couplers. The optical stack includes an array of microlenses positioned so that a bottom surface thereof is mounted to the PIC, and an array of microprisms is stacked on the array of microlenses so that a bottom surface thereof is mounted to a top surface of the array of microlenses.

24 Claims, 8 Drawing Sheets

42
40
32
30
20
13
16
22
21 y
z
x
42
42a
90°
$\alpha_1$
$\alpha_2$
90°
42b

| α (deg) | γ (deg) | h | | |
|---|---|---|---|---|
| | | Pitch=20µm | Pitch=50µm | Pitch=125µm |
| 1 | 2.5 | 0.35 | 0.87 | 2.18 |
| 2 | 5.0 | 0.70 | 1.75 | 4.37 |
| 3 | 7.6 | 1.05 | 2.62 | 6.55 |
| 4 | 10.1 | 1.40 | 3.50 | 8.74 |
| 5 | 12.8 | 1.75 | 4.37 | 10.94 |
| 6 | 15.5 | 2.10 | 5.26 | 13.14 |
| 7 | 18.2 | 2.46 | 6.14 | 15.35 |
| 8 | 21.2 | 2.81 | 7.03 | 17.57 |
| 9 | 24.2 | 3.17 | 7.92 | 19.80 |
| 10 | 27.4 | 3.53 | 8.82 | 22.04 |
| 11 | 30.9 | 3.89 | 9.72 | 24.30 |
| 12 | 34.7 | 4.25 | 10.63 | 26.57 |
| 13 | 38.9 | 4.62 | 11.54 | 28.86 |
| 14 | 43.9 | 4.99 | 12.47 | 31.17 |
| 15 | 49.9 | 5.36 | 13.40 | 33.49 |

| | | h | | |
|---|---|---|---|---|
| α (deg) | γ (deg) | Pitch=20μm | Pitch=50μm | Pitch=125μm |
| 2 | 0.92 | 0.70 | 1.75 | 4.37 |
| 4 | 1.85 | 1.40 | 3.50 | 8.74 |
| 6 | 2.78 | 2.10 | 5.26 | 13.14 |
| 8 | 3.72 | 2.81 | 7.03 | 17.57 |
| 10 | 4.69 | 3.53 | 8.82 | 22.04 |
| 12 | 5.67 | 4.25 | 10.63 | 26.57 |
| 14 | 6.68 | 4.99 | 12.47 | 31.17 |
| 16 | 7.73 | 5.73 | 14.34 | 35.84 |
| 18 | 8.82 | 6.50 | 16.25 | 40.61 |
| 20 | 9.96 | 7.28 | 18.20 | 45.50 |
| 22 | 11.16 | 8.08 | 20.20 | 50.50 |
| 24 | 12.43 | 8.90 | 22.26 | 55.65 |
| 26 | 13.79 | 9.75 | 24.39 | 60.97 |
| 28 | 15.27 | 10.63 | 26.59 | 66.46 |
| 30 | 16.89 | 11.55 | 28.87 | 72.17 |
| 32 | 18.69 | 12.50 | 31.24 | 78.11 |
| 34 | 16.58 | 13.49 | 33.73 | 84.31 |
| 36 | 23.11 | 14.53 | 36.33 | 90.82 |
| 38 | 26.01 | 15.63 | 39.06 | 97.66 |
| 40 | 29.80 | 16.78 | 41.95 | 104.89 |
| 42 | 35.67 | 18.01 | 45.02 | 112.55 |

FIG. 11

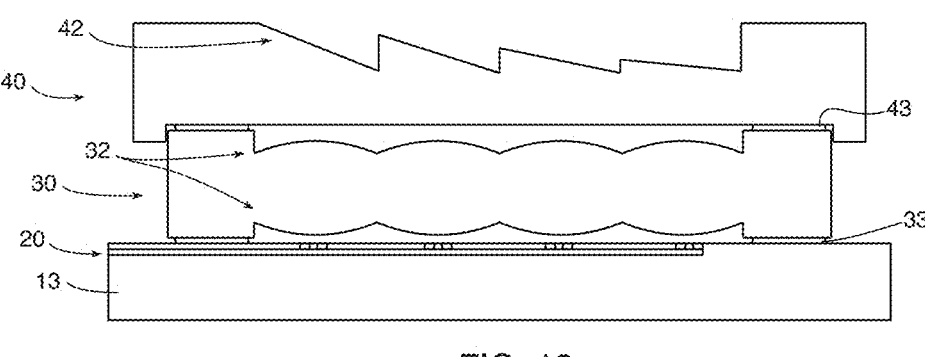
FIG. 12
FIG. 13
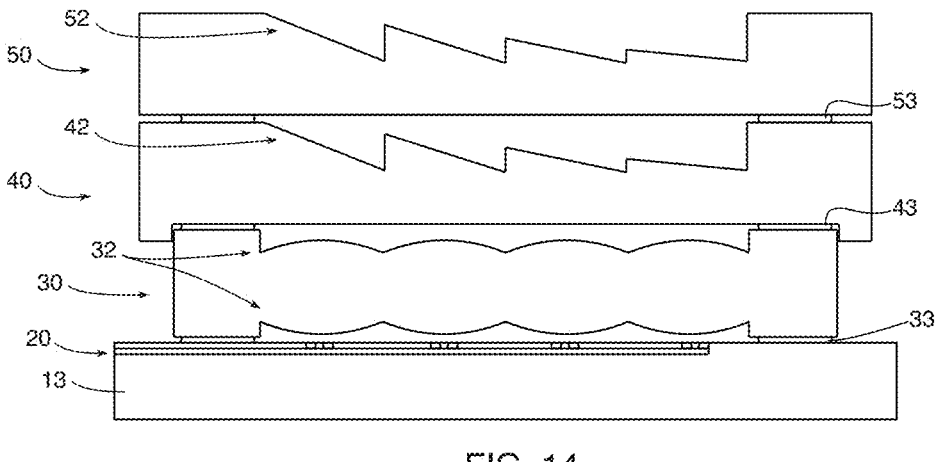
FIG. 14

MICROPRISM AND MICROLENS ARRAY FOR USE IN LIDAR SYSTEM

TECHNICAL FIELD

This disclosure is related to the field of sensor and transmitter circuits for performing distance determination and, in particular, to small form factor solid-state Light Detection and Ranging (LIDAR) devices utilizing microprism and microlens arrays in their optical paths.

BACKGROUND

Distance measuring systems, such as Light Detection and Ranging (LIDAR), are used to measure distance to a target and used in applications such as automotive applications, robotic vision applications, construction and industrial applications, geographical survey applications, military payload delivery applications, and other transportation applications. Two known types of LIDAR systems include time-of-flight based LIDAR systems and frequency-modulated continuous wave (FMCW) LIDAR systems.

There are two general classifications of time-of-flight (TOF) systems, namely direct and indirect. With direct time-of-flight systems, an emitter such as laser diode (typically infrared) is driven with a pulsed drive current to cause it to emit a short laser pulse in a given direction. This laser pulse is reflected by an object present in that given direction, and a receiver with a detector receives and senses the reflected laser pulse. The receiver, with a proper timing reference, measures the elapsed time between emitting of the laser pulse and receipt of the reflected laser pulse. From this elapsed time, the distance to the object can be evaluated. Through the use of an array of receiving elements in the receiver, a three-dimensional map of the object can therefore be formed.

The principle behind FMCW systems is as follows. The output of linearly frequency swept or "chirped" laser is split into a reference path to act as local oscillator, and a transmit path aimed toward the target or object to be detected. The laser light returning from the target is interofermetrically recombined with the laser light from the reference path and detected by a photodetector. This interference signal of the laser light in the two paths on the photodetector generates a sinusoidal beat signal whose frequency is proportional to the distance of the target. A Fourier Transform converts this time-domain beat signal into a peak in the frequency domain, thus the distance to the target can be extracted. In addition, if the target is moving, its velocity and distance can be detected simultaneously by utilizing both up-chip and down-chirp of the laser frequency.

Current LIDAR systems typically utilize external optic systems in their optical paths. It is desired, however, to design solid-state LIDAR devices that maintain a small form factor. Therefore, further development is needed.

SUMMARY

Disclosed herein is a LIDAR optical unit, including a carrier, with a photonic integrated circuit (PIC) chip affixed to the carrier. The PIC chip has at least one input coupler and an array of output couplers defined therein, the PIC chip having a switchable optical network that selectively optically connects the at least one input coupler to different selected ones of the array of output couplers. A laser source is mounted to the PIC chip adjacent the at least one input coupler such that laser light generated by the laser source is injected into the at least one input coupler. An optical stack is mounted to the PIC chip adjacent the array of output couplers so as to receive laser light extracted from the switchable optical network by different ones of the array of output couplers. The optical stack includes an array of microlenses positioned such that a bottom surface thereof is mounted to the PIC chip, and an array of microprisms stacked on the array of microlenses such that a bottom surface of the array of microprisms is mounted to a top surface of the array of microlenses.

Each microlens of the array thereof may be positioned immediately adjacent a different output coupler of the array thereof, such that the microlenses and output couplers are equal in number.

The array of microlenses may be integrally formed as a monolithic unit, and the array of microprisms may also be integrally formed as a monolithic unit.

The bottom surface of the array of microlenses may be generally flat in shape, with microlensing structures being defined by the top surface of the array of microlenses.

The bottom surface of the array of microprisms may be generally flat in shape, with microprism structures being defined by the top surface of the array of microprisms.

The bottom surface of the array of microlenses may have first microlensing structures defined therein, and the top surface of the array of microlenses may have second microlensing structures defined therein.

The optical stack may include an optical body having a top surface defining the array of microprisms and a bottom surface defining the array of microlenses.

Each microprism of the array thereof may have six sides, the six sides including the top surface as a top side and the bottom surface as a bottom side, with two immediately adjacent ones of the six sides other than the top side and bottom side having triangular cross sections, and the other two immediately adjacent ones of the six sides other than the top side and bottom side having rectangular cross sections.

A height of rectangular cross sections of different microprisms may be the same while a height of triangular cross sections of certain different microprisms is different.

The switchable optical network may include a series of waveguides and beam switches, the beam switches being selectively settable to optically connect the at least one input coupler to a desired one of the array of output couplers.

An electronic integrated circuit (EIC) chip may be mounted on the PIC chip and configured to control the beam switches to sequentially connect the at least one input coupler to each of the array of output couplers, one at a time.

Also disclosed herein is a LIDAR optical unit, including a carrier, with a photonic integrated circuit (PIC) chip affixed to the carrier. The PIC chip has an array of input couplers and at least one output coupler defined therein, the PIC chip having a switchable optical network that selectively optically connects different ones of array of input couplers to the at least one output coupler. A photodetector is mounted to the PIC chip adjacent the at least one output coupler to detect laser light extracted from the switchable optical network. An optical stack is mounted to the PIC chip adjacent the array of input couplers so as to receive laser light that has reflected off a target for injection into the switchable optical network by different ones of the array of input couplers. The optical stack includes an array of microlenses positioned such that a bottom surface thereof is mounted to the PIC chip, and an array of microprisms stacked on the array of microlenses such that a bottom surface of the array of microprisms is mounted to a top surface of the array of microlenses.

Each microlens of the array thereof may be positioned immediately adjacent a different input coupler of the array thereof, such that the microlenses and input couplers are equal in number.

The array of microlenses may be integrally formed as a monolithic unit, and the array of microprisms may be integrally formed as a monolithic unit.

The bottom surface of the array of microlenses may be generally flat in shape, with microlensing structures being defined by the top surface of the array of microlenses.

The bottom surface of the array of microprisms may be generally flat in shape, with microprism structures being defined by the top surface of the array of microprisms.

The bottom surface of the array of microlenses may have first microlensing structures defined therein, and the top surface of the array of microlenses may have second microlensing structures defined therein.

The optical stack may include an optical body having a top surface defining the array of microprisms and a bottom surface defining the array of microlenses.

Each microprism of the array thereof may have six sides, the six sides including the top surface as a top side and the bottom surface as a bottom side, with two immediately adjacent ones of the six sides other than the top side and bottom side having triangular cross sections, and the other two immediately adjacent ones of the six sides other than the top side and bottom side having rectangular cross sections.

A height of rectangular cross sections of different microprisms may be the same while a height of triangular cross sections of certain different microprisms is different.

The switchable optical network may include a series of waveguides and beam switches, the beam switches being selectively settable to optically connect a desired one of the array of input couplers to the at least one output coupler.

An electronic integrated circuit (EIC) chip may be mounted on the PIC chip and configured to control the beam switches to sequentially connect the at least one output coupler to each of the array of input couplers, one at a time.

BRIEF DESCRIPTION OF THE DRAWINGS

FIG. 11 is a second table showing potential angles and pitches of for the microprisms of the microprism array.

FIG. 12 is an enlarged cross sectional view of a portion of the package of FIG. 1, illustrating possible structure shapes of the microlens and microprism arrays.

FIG. 13 is an enlarged cross sectional view of a portion of the package of FIG. 1, illustrating an embodiment in which the microlens array and microprism array are integrally formed.

FIG. 14 is an enlarged cross sectional view of a portion of the package of FIG. 1, illustrating an embodiment in which two microprism arrays are affixed in a stacked relationship with the microlens array.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figures 1, 2:
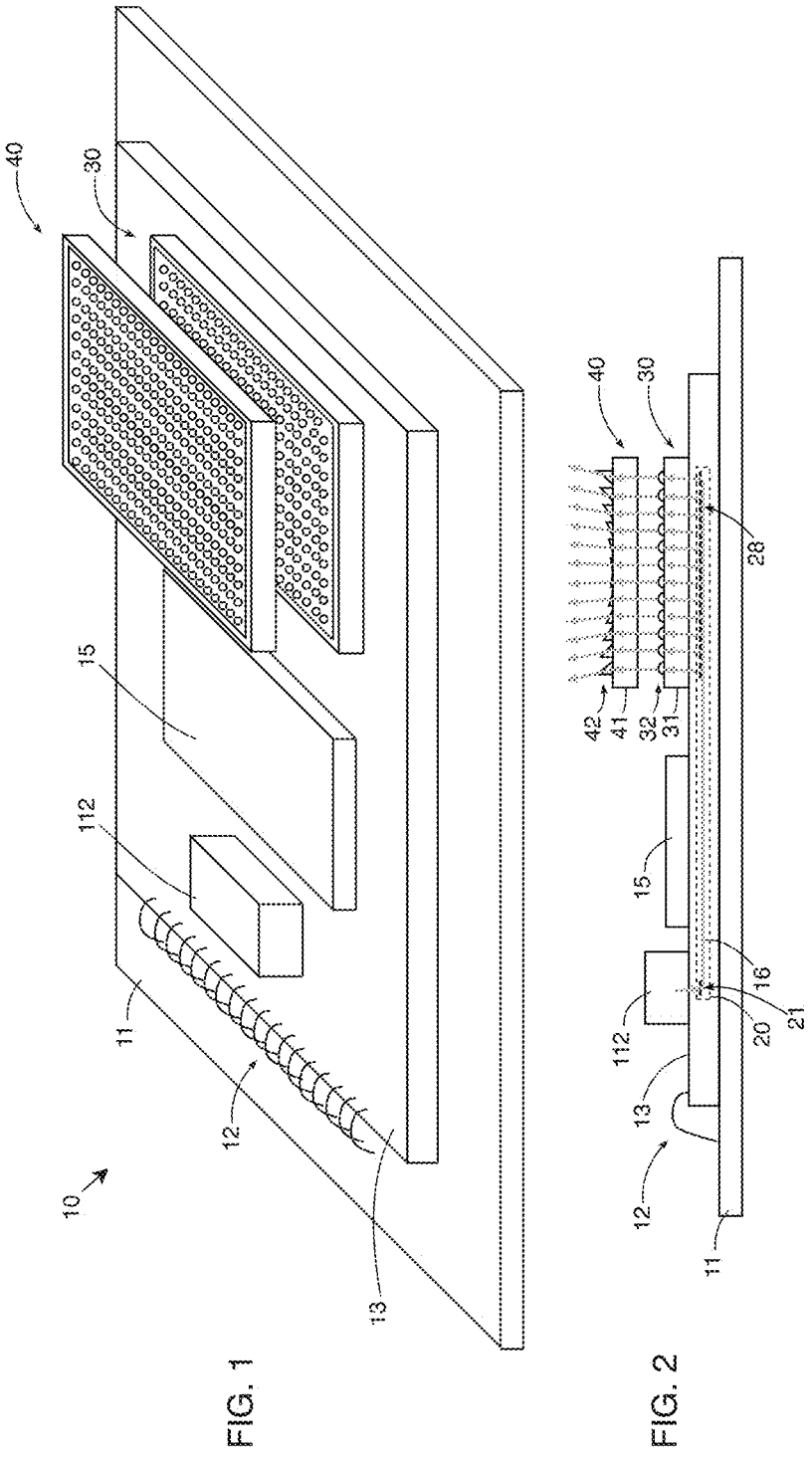
FIG. 1 is an exploded perspective view of a package described herein containing laser emitter and its associated photonic and electric circuitry.
FIG. 2 is an exploded cross sectional view of the package of FIG. 1.
Figure 3:
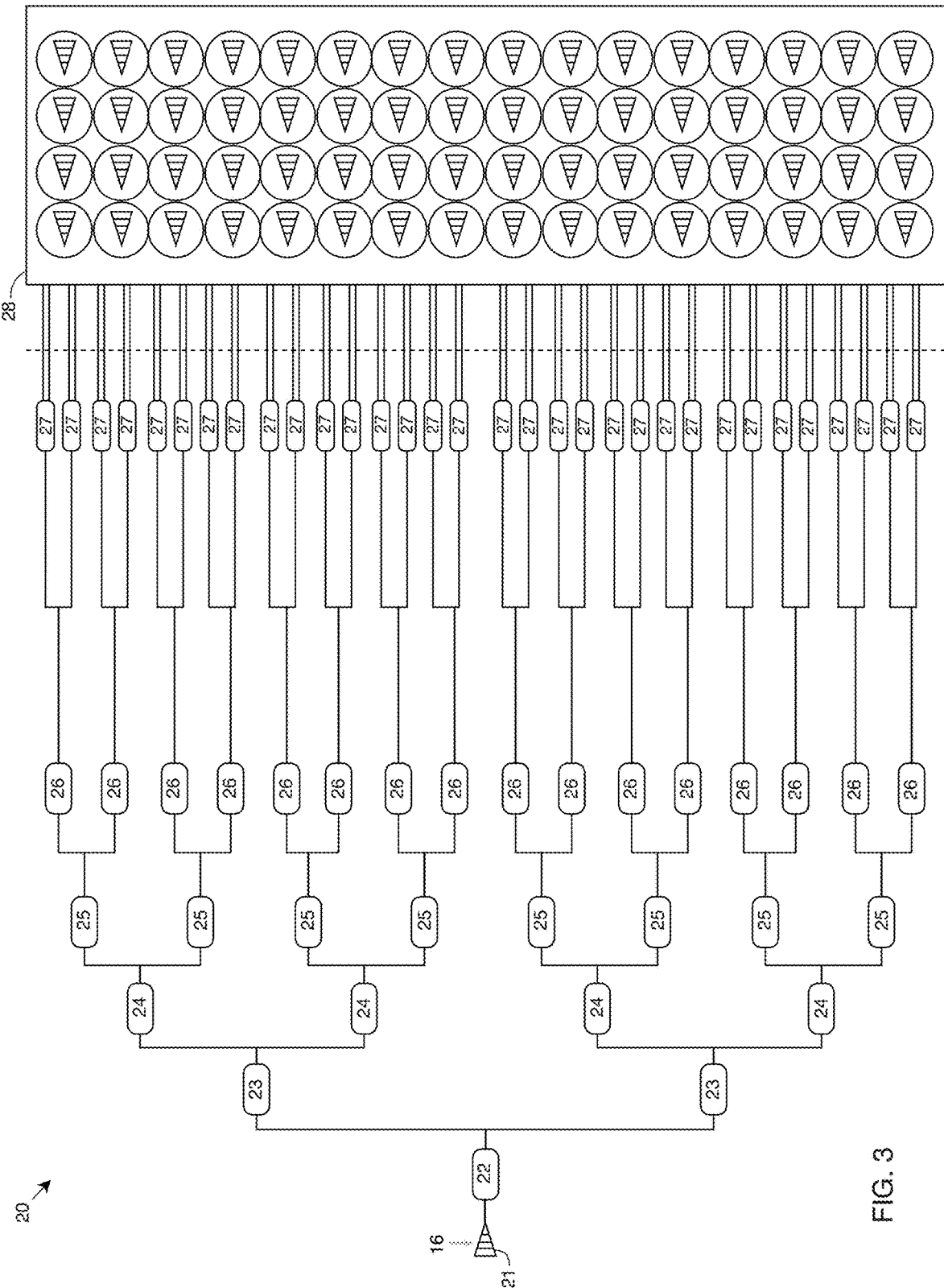
FIG. 3 is a diagrammatical view of the optical beam switches and waveguides within the photonic integrated circuit of FIGS. 1-2.

All, or portions of, a LIDAR system, such as a FMCW LIDAR system, may be incorporated into a single package. Now described with reference to FIGS. 1-3 is a package 10 including at least laser emitter 112 and components associated with the collimation and focus of the produced laser beam for use in a FMCR LIDAR system. Notice that FIG. 1 is an exploded perspective view of the package 10 while FIG. 2 is an exploded cross sectional view of the package along longitudinal axis thereof.

The package 10 includes a carrier 11, such as a printed circuit board (PCB), upon which a photonic integrated circuit (PIC) chip 13 is mounted. Components of the PIC 13 may be electrically connected to respective components of the PCB 11 through wire bonding 12. The PIC 13 has an optical path switching matrix 20 defined therein. In this example, the laser emitter 112 is mounted on the PIC 13 and is oriented to inject a generated laser beam 16 (e.g., formed from collimated short-wave infrared light) through an input coupler (not shown) and into the optical path switching matrix 20.

In other configurations, the laser emitter 112 can be connected to the PIC 13 through an optical fiber or may be directly connected to the PIC 13 at the edge of the PIC. In the specific embodiment discussed herein, the input coupler is an input grating coupler, but it should be appreciated that the input coupler may be any device that couples the light from the laser beam 16 to the optical path switching matrix 20, that could be, for example, a direct "butt coupling", an adiabatic coupler, etc.

An electronic integrated circuit (EIC) 15 is mounted on the PIC 13, and includes electronics enabling selection of which optical path within the optical path switching matrix 20 through which the laser beam 16 travels, such electronics within the EIC 15 being operatively connected to the optical path switching matrix 20 to facilitate the optical path selection.

A microlens array 30 is mounted on the PIC 13 over an output coupler array 28, the output couplers 29 of which serve to extract the laser beam 16 from the optical path and direct the laser beam 16 upwardly toward the microlens array 30. In the specific embodiment discussed herein, the output couplers are output grating couplers, but it should be appreciated that the output couplers may be any devices that couple the light from optical path switching matrix 20 to the microlens array 30, that could be, for example, micromirrors.

A microprism array 40 is mounted to the microlens array 30 such that as the laser beam 16 exits the microlens array 30, it enters the microprism array 40. The structure of the microlens array 30 and microprism array 40 will be described in detail below, but note that as to the microlens array, microlenses 32 extend from the microlens body 31, and microprisms 42 extend from the microprism body 41.

Figure 4:
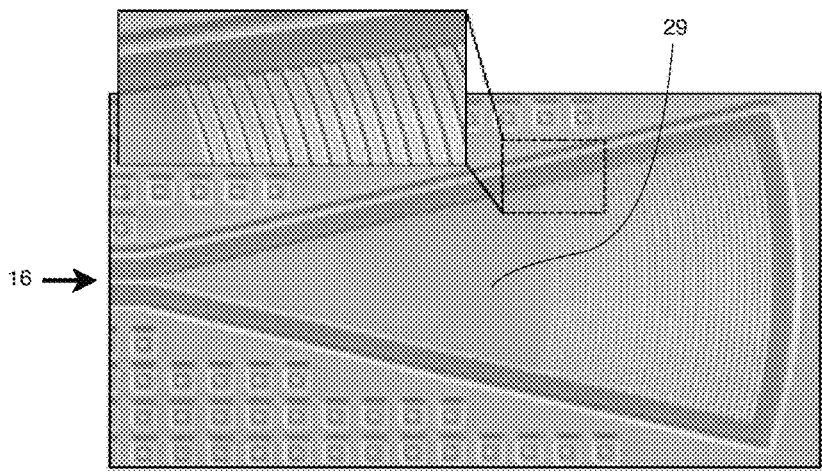
FIG. 4 is a greatly enlarged overhead view of a possible implementation of the grating couplers of FIGS. 1-3.
Figure 5:
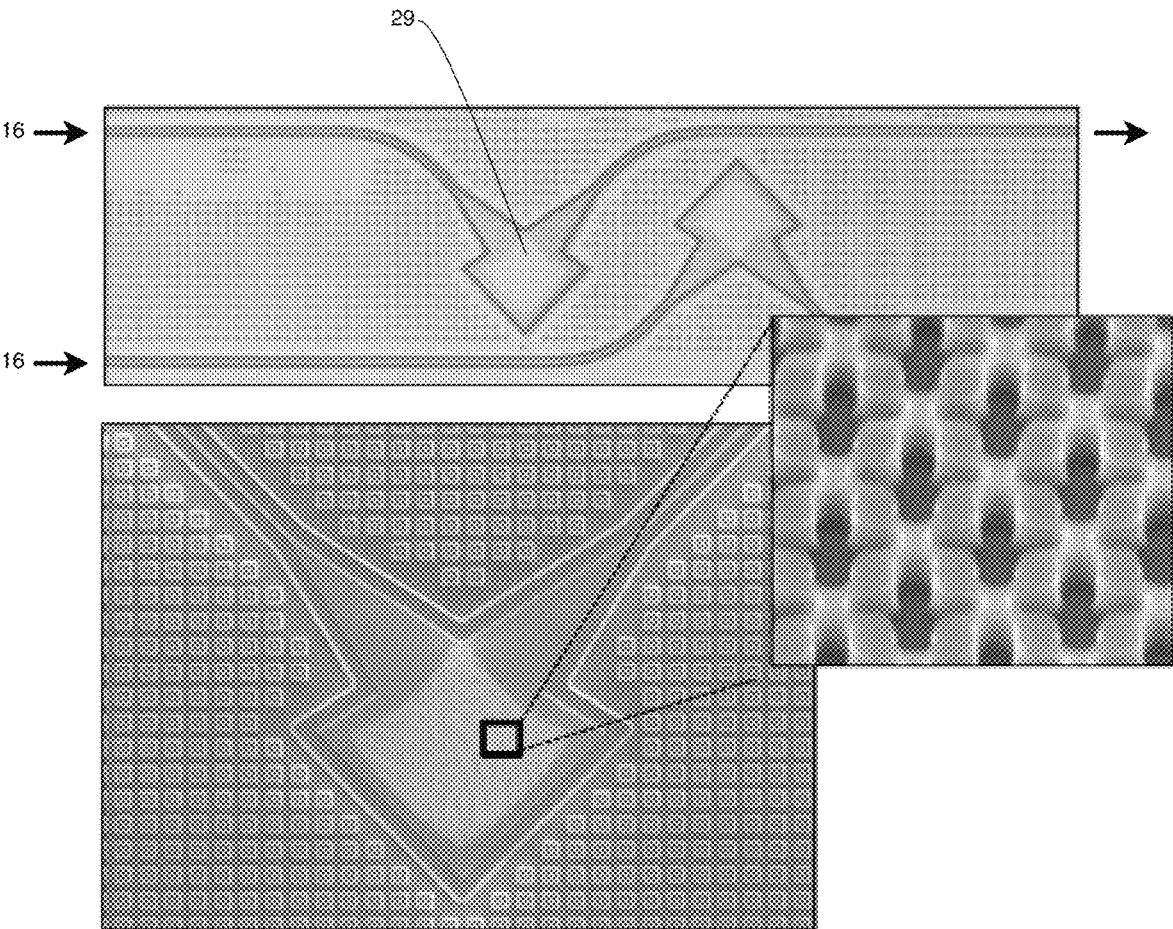
FIG. 5 is a greatly enlarged overhead view of another possible implementation of the grating couplers of FIGS. 1-3.

The optical path switching matrix 20 is now described with reference to the schematic illustration of FIG. 3. The optical path switching matrix 20 includes the input grating coupler 21 into which the laser beam 16 is injected. A waveguide connects the input grating coupler 21 to a first beam switch 22. The first beam switch 22, under control of the EIC 15, selectively directs its output (and therefore the laser beam 16) through a waveguide toward one of the second beam switches 23. Each second beam switch 23, under control of the EIC 15, selectively directs its output (and therefore the laser beam 16 if that beam switch received the laser) through a waveguide to two third beam switches 24. Each third beam switch 24, under control of the EIC 15, selectively directs its output (and therefore the laser beam 16 if that beam switch received the laser) through a waveguide to two fourth beam switches 25. Each fourth beam switch 25, under control of the EIC 15, selectively directs its output (and therefore the laser beam 16 if that beam switch received the laser) through a waveguide to two fifth beam switches 26. Each fifth beam switch 26, under control of the EIC 15, selectively directs its output (and therefore the laser beam 16 if that beam switch received the laser) to two sixth beam switches 27. Each sixth beam switch 27 selectively directs its output (and therefore the laser beam 16 if that beam switch received the laser) through a waveguide to two different output grating couplers of the output grating coupler array 28. The various beam switches 22-27 may be Mach-Zehnder based interferometers or ring resonators, for example. Example suitable structures 29 for the output grating couplers may be seen in FIGS. 4-5, with it being understood that other suitable designs may be utilized.

Through its control of the optical path switching matrix 20 and its various beam switches 22-28, each output grating 29 of the output grating coupler array 28 may be sequentially controlled by the EIC 15 to receive the laser beam 16 at a different point in time—one output grating at a time receives the laser beam 16, and therefore the laser beam 16 is output from one output grating at a time to one of the microlenses 32 of the microlens array 30. This sequential operation may be performed during operation to provide for LIDAR operation.

Figures 6, 7, 8:
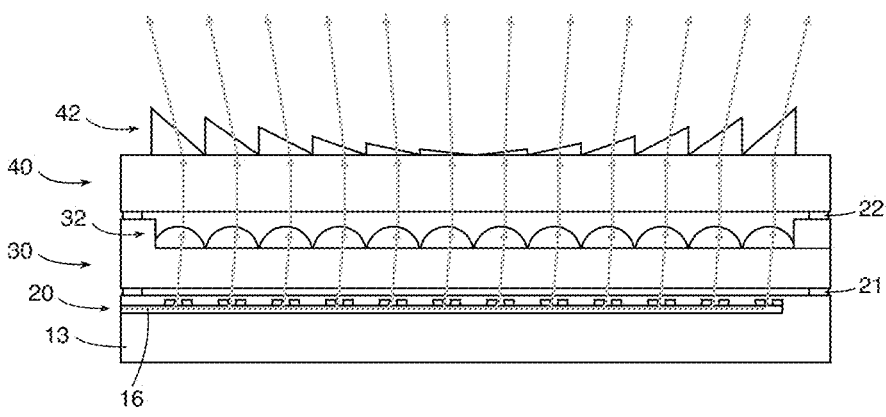
FIG. 6 is an enlarged cross sectional view of a portion of the package of FIG. 1, illustrating the structure of the microlens and microprism arrays.
FIG. 7 is a perspective view of a possible implementation of a given microprism of the microprism array of FIGS. 1-3, and 6.
FIG. 8 is a perspective view of a possible implementation of multiple given microprisms of the microprism array of FIGS. 1-3, and 6, illustrating the different angles between different microprisms of the array.

Specific implementation details of one embodiment of the microlens array 30 and microprism array 40 may be found in FIG. 6. The bottom surface of the microlens array 30 is affixed to the top surface of the PIC 13 via pads 21 positioned about the perimeter of the bottom surface of the microlens array 30, and the bottom surface of the microprism array 40 is affixed to the top surface of the microlens array 30 via pads 22 positioned about the perimeter of the bottom surface of the microprism array 40.

Notice here that each microlens 32 of the microlens array 30 is spherical in shape and is positioned over a respective one of the output gratings 29 of the output grating coupler array 28, although different lens shapes may be used. The microlenses 32 may be identical in shape and dimension. The microlenses 32 serve to collimate the laser beam 16 as it passes therethrough and direct the laser beam 16 on a desired path toward one of the microprisms 42 of the microprism array 40.

The illustrated microprisms 42 of the microprism array 40 are differently shaped depending upon their positions. Refer now to FIG. 7, which illustrates a single microprism 42 of the microprism array 40. The bottom surface of the microprism 42 can be observed to lay in the z-x plane. To best understand the shape of the microprism 42, consider a rectangular prism, which has six faces and eight corners (vertices), with each corner laying in the z-x plane having an adjacent corner spaced apart therefrom solely along the y-axis, and then eliminate the y-axis separation between two of these adjacent corners. This results in two faces of the microprism having triangular cross sections, labelled as 42a and 42b, with the other two faces of the microprism remaining as having a rectangular cross section. The triangular cross sections 42a and 42b are right-triangles, each having an angle $\alpha$ as illustrated (labelled $\alpha_1$ for face 42a and $\alpha_2$ for face 42b). Angles $\alpha_1$ and $\alpha_2$ may be, but need not be, equal.

Each different microprism 42 of the microprism array 40 may have different angles $\alpha_1$ and $\alpha_2$ from one another, for example, as shown in FIG. 8. This will now be discussed in detail with reference to FIG. 9, where it can be observed that the length of the side of the triangular cross section of each face 42a and 42b of each microprism 42 that is opposite to angle $\alpha$ is labelled as h (e.g., height), and can be referred to as the "pitch" of that microprism. In the microprism array 40, the pitch of each microprism 42 may be the same, while the angle $\alpha$ (with both $\alpha_1$ and $\alpha_2$ being equal to a, for example) may be different for each microprism 42. Sample values of a for different pitches may be found in FIGS. 10-11—FIG. 10 refers to microprisms formed in silicon (n=3.5) while FIG. 11 refers to microprisms formed in silica (n=1.46). Pitch described herein may refer to the height (distance between top surface and bottom surface) of the faces having rectangular cross sections.

A close up cross sectional view of the PIC 13, microlens array 30, and microprism array may be seen in FIG. 12. Observe that the bottom surface of the microlens array 30 is affixed to the top surface of the PIC 13 by a pad or pads 33 positioned about the perimeter of the microlens array 30, and that the bottom surface of the microprism array 40 is affixed to the top surface of the PIC 13 by a pad or pads 43 positioned about the perimeter of the bottom surface of the microprism array 40. Also observe that, as an optional example, the microlenses 32 may be present on both the top surface and bottom surface of the microlens array 30.

Another optional example is shown in FIG. 13. Here, the microlenses 32 and microprisms 42 are integrally formed as a monolithic unit, with the bottom surface of the combined optical block 430 defining the microlenses 32, and with the top surface of the combined optical block 430 defining the microprisms 42. The combined optical block 430 is affixed to the PIC 13 by a pad or pads 33 positioned about the perimeter of the bottom surface of the optical block 430.

Two microprism arrays may be stacked upon one another, as shown in FIG. 14, where the bottom surface of the microprism array 50 is affixed to the top surface of the microprism array 40 via pads 53 positioned about the perimeter of the bottom surface of the microprism array 50.

The various grating couplers described above may instead be flat or curved micromirrors if appropriate for a given application.

The above examples and embodiments have been described with reference to laser emitter 112 injecting a generated laser beam 16 through an input grating coupler 21, with the laser light passing through the optical path switching matrix 20 and being extracted through an output grating coupler 28. However, the examples and embodiments are equally applicable to the example 10' shown in FIGS. 15-16 in which laser light 16 that has reflected off a target enters the microprism array 40 and travels therethrough to the microlens array 30, after which it is injected through an input grating coupler 21 or an array of input grating couplers into the optical path switching matrix 20. In this instance, the laser light 16 is therefore extracted from the optical path switching matrix 20 by an output grating coupler 29 for detection by a photodetector 214, or, as an alternative, is directly coupled through the optical path switching matrix 20 to a photodetector integrated into the PIC 13.

Figures 9, 10:
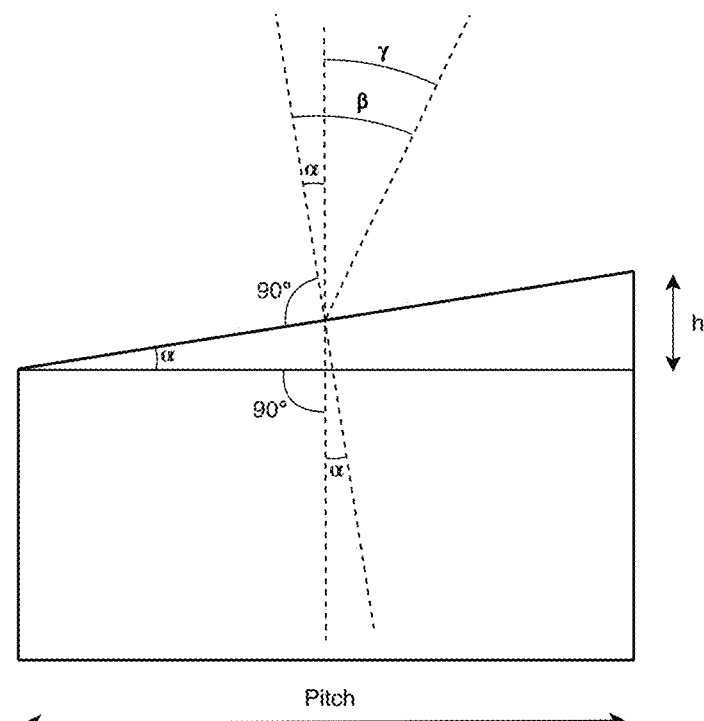
FIG. 9 is a diagrammatical view of a given microprism of the microprism array of FIGS. 1-3, and 6, illustrating the different dimensions and angles of its cross section.
FIG. 10 is a first table showing potential angles and pitches of for the microprisms of the microprism array.
Figures 15, 16:
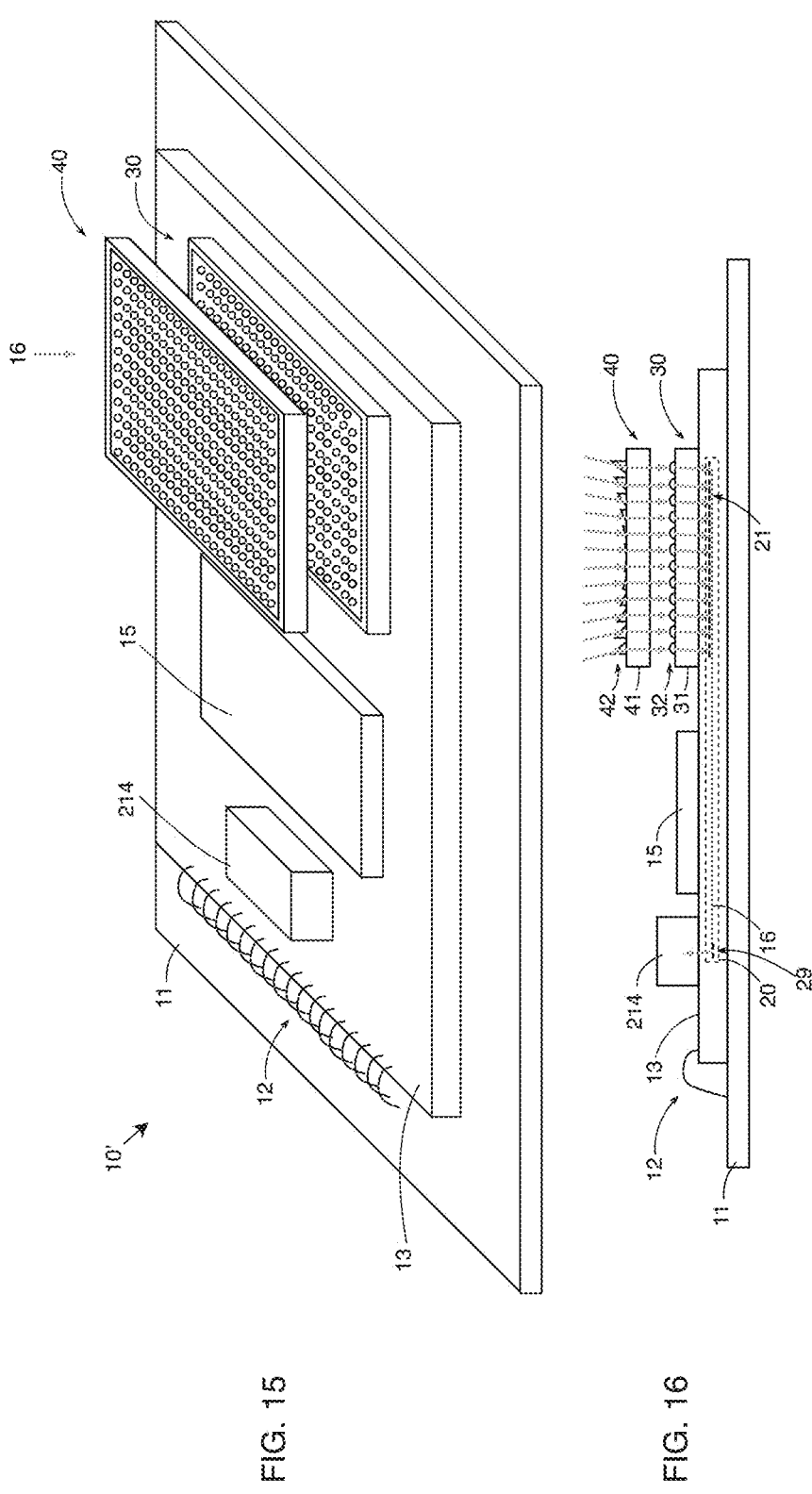
FIG. 15 is an exploded perspective view of a package described herein containing a photodetector and its associated photonic and electric circuitry.
FIG. 16 is an exploded cross sectional view of the package of FIG. 15.

As should be appreciated, this package 10' is therefore a reversal of the direction of laser travel and a reversal of the use of the package 10 of FIG. 1—the package 10 of FIG. 10 was used for emitting laser light, while the package 10' of FIG. 15 is for detecting laser light. The specific structure of the microprism array, microlens array 30, and optical path switching matrix 20 otherwise remains the same.

The designs of the packages 10 and 10' described above provide for the low-cost manufacture of small form factor LIDAR systems for use in applications where space is at a premium. These designs also provide for a high angle of deflection of the laser beam up through the output gratings, or down into the input gratings while having a relatively low overall thickness, facilitating easy formation through standard etching processes.

Finally, it is clear that modifications and variations may be made to what has been described and illustrated herein, without thereby departing from the scope of this disclosure, as defined in the annexed claims.

While the disclosure has been described with respect to limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A LIDAR optical unit, comprising:
a carrier;
a photonic integrated circuit (PIC) chip affixed to the carrier, the PIC chip having at least one input coupler and an array of output couplers defined therein, the PIC chip having a switchable optical network that selectively optically connects the at least one input coupler to different selected ones of the array of output couplers;
laser source mounted to the PIC chip adjacent the at least one input coupler such that laser light generated by the laser source is injected into the at least one input coupler; and
an optical stack mounted to the PIC chip adjacent the array of output couplers so as to receive laser light extracted from the switchable optical network by different ones of the array of output couplers;

wherein the optical stack comprises:
an array of microlenses positioned such that a bottom surface thereof is mounted to the PIC chip; and
an array of microprisms stacked on the array of microlenses such that a bottom surface of the array of microprisms is mounted to a top surface of the array of microlenses.

2. The LIDAR optical unit of claim 1, wherein each microlens of the array thereof is positioned immediately adjacent a different output coupler of the array thereof, such that the microlenses and output couplers are equal in number.

3. The LIDAR optical unit of claim 1, wherein the array of microlenses is integrally formed as a monolithic unit; and wherein the array of microprisms is integrally formed as a monolithic unit.

4. The LIDAR optical unit of claim 3, wherein the bottom surface of the array of microlenses is generally flat in shape, with microlensing structures being defined by the top surface of the array of microlenses.

5. The LIDAR optical unit of claim 3, wherein the bottom surface of the array of microprisms is generally flat in shape, with microprism structures being defined by the top surface of the array of microprisms.

6. The LIDAR optical unit of claim 3, wherein the bottom surface of the array of microlenses has first microlensing structures defined therein; and wherein the top surface of the array of microlenses has second microlensing structures defined therein.

7. The LIDAR optical unit of claim 1, wherein the optical stack comprises an optical body having a top surface defining the array of microprisms and a bottom surface defining the array of microlenses.

8. The LIDAR optical unit of claim 1, wherein each microprism of the array thereof has six sides, the six sides including the top surface as a top side and the bottom surface as a bottom side, with two immediately adjacent ones of the six sides other than the top side and bottom side having triangular cross sections, and the other two immediately adjacent ones of the six sides other than the top side and bottom side having rectangular cross sections.

9. The LIDAR optical unit of claim 8, wherein a height of rectangular cross sections of different microprisms is the same while a height of triangular cross sections of certain different microprisms is different.

10. The LIDAR optical unit of claim 1, wherein the switchable optical network includes a series of waveguides and beam switches, the beam switches being selectively settable to optically connect the at least one input coupler to a desired one of the array of output couplers.

11. The LIDAR optical unit of claim 10, further comprising an electronic integrated circuit (EIC) chip mounted on the PIC chip and configured to control the beam switches to sequentially connect the at least one input coupler to each of the array of output couplers, one at a time.

12. A LIDAR optical unit, comprising:
a carrier;
a photonic integrated circuit (PIC) chip affixed to the carrier, the PIC chip having an array of input couplers and at least one output defined therein, the PIC chip having a switchable optical network that selectively optically connects different ones of array of input couplers to the at least one output;
a photodetector adjacent the at least one output to detect laser light extracted from the switchable optical network; and an optical stack mounted to the PIC chip adjacent the array of input couplers so as to receive laser light that has reflected off a target for injection into the switchable optical network by different ones of the array of input couplers;

wherein the optical stack comprises:

an array of microlenses positioned such that a bottom surface thereof is mounted to the PIC chip; and an array of microprisms stacked on the array of microlenses such that a bottom surface of the array of microprisms is mounted to a top surface of the array of microlenses.

13. The LIDAR optical unit of claim 12, wherein each microlens of the array thereof is positioned immediately adjacent a different input coupler of the array thereof, such that the microlenses and input couplers are equal in number.

14. The LIDAR optical unit of claim 13, wherein the bottom surface of the array of microlenses is generally flat in shape, with microlensing structures being defined by the top surface of the array of microlenses.

15. The LIDAR optical unit of claim 13, wherein the bottom surface of the array of microprisms is generally flat in shape, with microprism structures being defined by the top surface of the array of microprisms.

16. The LIDAR optical unit of claim 13, wherein the bottom surface of the array of microlenses has first microlensing structures defined therein; and wherein the top surface of the array of microlenses has second microlensing structures defined therein.

17. The LIDAR optical unit of claim 12, wherein the array of microlenses is integrally formed as a monolithic unit; and wherein the array of microprisms is integrally formed as a monolithic unit.

18. The LIDAR optical unit of claim 12, wherein the optical stack comprises an optical body having a top surface defining the array of microprisms and a bottom surface defining the array of microlenses.

19. The LIDAR optical unit of claim 12, wherein each microprism of the array thereof has six sides, the six sides including the top surface as a top side and the bottom surface as a bottom side, with two immediately adjacent ones of the six sides other than the top side and bottom side having triangular cross sections, and the other two immediately adjacent ones of the six sides other than the top side and bottom side having rectangular cross sections.

20. The LIDAR optical unit of claim 19, wherein a height of rectangular cross sections of different microprisms is the same while a height of triangular cross sections of certain different microprisms is different.

21. The LIDAR optical unit of claim 12, wherein the switchable optical network includes a series of waveguides and beam switches, the beam switches being selectively settable to optically connect a desired one of the array of input couplers to the at least one output.

22. The LIDAR optical unit of claim 21, further comprising an electronic integrated circuit (EIC) chip mounted on the PIC chip and configured to control the beam switches to sequentially connect the at least one output to each of the array of input couplers, one at a time.

23. The LIDAR optical unit of claim 12, wherein the photodetector is integrated within the PIC chip and directly optically coupled to the at least one output.

24. The LIDAR optical unit of claim 12, wherein the at least one output is at least one output coupler; and wherein the photodetector is mounded to the PIC chip adjacent to the at least one output coupler.

* * * * *